United States Patent [19]  [11]  4,143,538
Karsh et al.  [45]  Mar. 13, 1979

[54] METHODS AND APPARATUS FOR MANUFACTURING TACHOMETERS

[75] Inventors: Herbert Karsh, Laguna Beach; J. Clyde Norton, Van Nuys, both of Calif.

[73] Assignee: Bell & Howell Company, Chicago, Ill.

[21] Appl. No.: 860,812

[22] Filed: Dec. 15, 1977

Related U.S. Application Data

[63] Continuation-in-part of Ser. No. 669,062, Mar. 22, 1976, abandoned.

[51] Int. Cl.² .................................................. G01C 25/00
[52] U.S. Cl. .......................................... 73/2; 361/236; 324/164
[58] Field of Search .................... 73/2, 1 R, 5; 116/129 R, 129 F; 33/1 N; 274/1 K; 361/236, 239; 324/74, 75, 160, 164, 172, 173, 175

[56] References Cited
U.S. PATENT DOCUMENTS

| | | | |
|---|---|---|---|
| 2,178,962 | 11/1939 | Gottschalk | 33/1 N |
| 2,995,705 | 8/1961 | Walker et al. | 361/236 |
| 3,292,082 | 12/1966 | Braine et al. | 361/239 |
| 3,312,861 | 4/1967 | Mauch | 361/236 |
| 3,325,901 | 6/1967 | Bruscaglioni | 116/129 R X |
| 3,738,152 | 6/1973 | Green | 73/1 R |

Primary Examiner—Richard C. Queisser
Assistant Examiner—Joseph W. Roskos
Attorney, Agent, or Firm—Benoit Law Corporation

[57] ABSTRACT

The manufacture of a tachometer of a type having annularly arranged tachometer markings on a rotary tachometer device includes the steps of rotating the tachometer device. A signal is generated having recurring signal portions for providing tachometer markings upon recordation on the rotary tachometer device. The number of signal portions occurring in the latter signal during a revolution of the rotating tachometer device is adapted to a whole number of tachometer markings accommodable on the tachometer device in a continuous circular array. The signal having the mentioned adapted number of signal portions is recorded onto the rotating tachometer device to provide the tachometer markings in a continuous circular array.

22 Claims, 3 Drawing Figures

U.S. Patent        Mar. 13, 1979        4,143,538
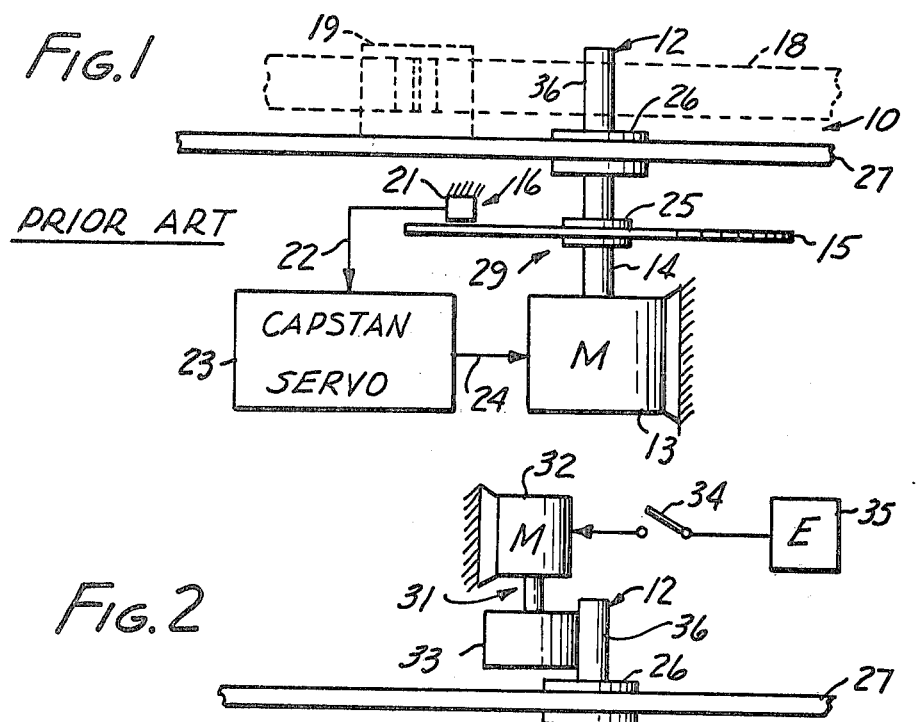
PRIOR ART
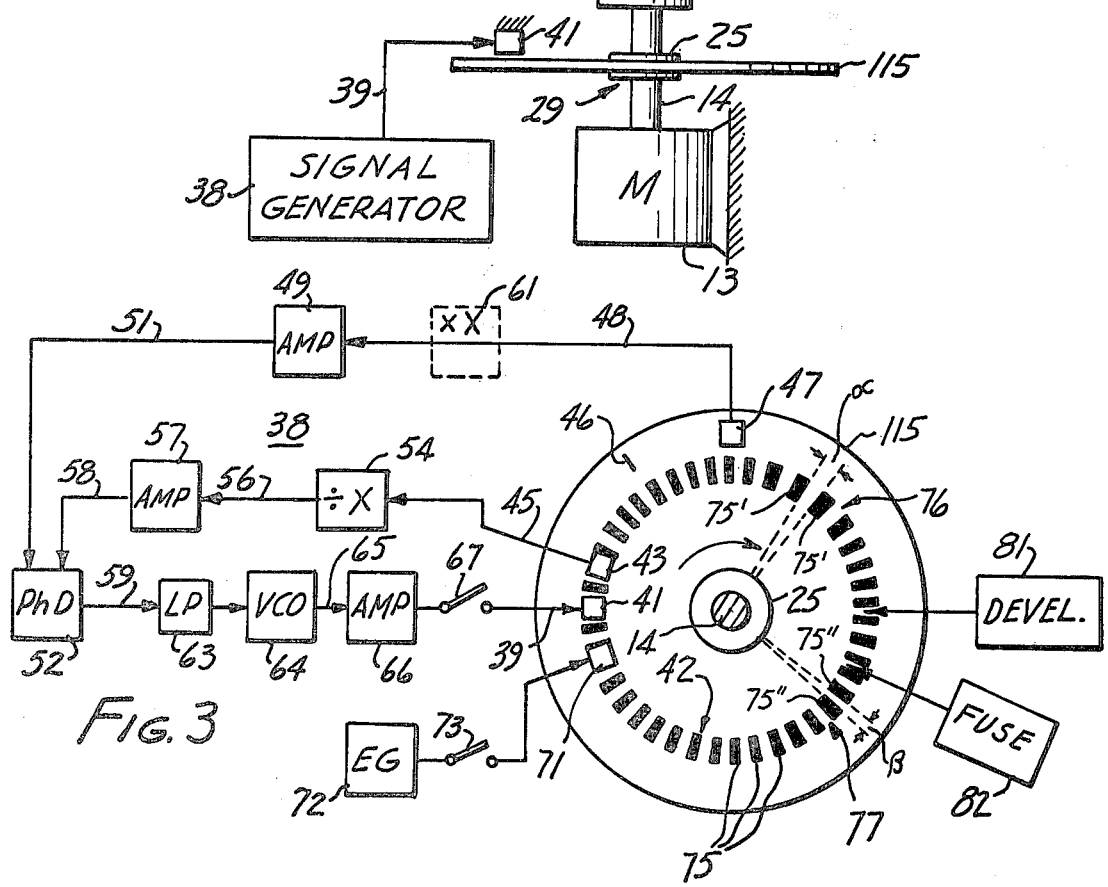

METHODS AND APPARATUS FOR MANUFACTURING TACHOMETERS

CROSS-REFERENCE

This is a continuation-in-part of patent application Ser. No. 669,062 entitled Methods and Apparatus for Manufacturing Tachometers, filed by the subject inventors on Mar. 22, 1976 now abandoned, and herewith incorporated by reference herein.

BACKGROUND OF THE INVENTION

1. Field of the Invention

The subject invention relates to tachometers and to methods and apparatus for manufacturing tachometers of a type having annularly arranged tachometer markings on a rotary tachometer device. By way of example, tachometer devices of the type herein disclosed may be used in the servo control portion of magnetic tape transports, but the utility of the disclosed invention extends beyond that application.

2. Description of the Prior Art

Periodically recurring error signals are a notorious source of malfunction and design and application limitation in servo systems. In particular, a periodic error signal component in a variable input signal of a servo system causes the system to malfunction or at least operate at less than its inherent potential on the one hand and, on the other hand, calls for corrective measures which either render the system expensive or introduce limitations in the full use of the system.

By way of example, periodic error signals in a tachometer signal of a servo control of a rotating drive provoke angular velocity perturbations which affect the performance of the system.

The prior-art effort in this area has been mainly concerned with the source of the periodic disturbance. In particular, most remedial attempts have focused on a mechanical perfection of the parts at the location of generation of the periodic disturbance. Pursuant to this attitude, the typical remedial approach to periodic error signals is in a tachometer signal has culminated in attempts to perfect the tachometer and the equipment coupled thereto and to the associated electromechanical drive. This, in turn, has introduced design and manufacturing complexities, has increased the expense of the resulting equipment, and has subjugated attainable performance to the dictates of mechanical design and feasibility limitations.

Prior-art attempts to solve the problem electronically have not been sufficiently effective as to permit a material reduction of the need for mechanical solutions of the above mentioned type.

For instance, the U.S. Pat. No. 3,312,861, by P. A. Mauch, issued Apr. 4, 1967, proposes the employment of a "mark-read" principle in which a time pulse signal is applied to a recording head for a continuous recording thereof on a rotating tachometer disk. A playback head practically instantaneously reproduces that recorded signal which thereupon is employed to control a servo motor which drives the tachometer disk.

In practice, the utility of that prior-art method is limited to the actual operation of the magnetic tape transport or other equipment which the control servo motor is driving. A reason for this limitation resides in the fact that the prior-art proposal under consideration, as well as any other prior-art technique known to applicants, lacks any facility for a recording of tachometer markings in a continuous circular array. In consequence, even a satisfactory operation of the prior-art proposal under consideration would not lead to a tachometer disk or other rotary tachometer device in which reproducible tachometer markings were arranged in a continuous circular array with no overlapping of markings or similar discontinuities. Accordingly, the prior-art proposal under consideration continuously erases the recorded tachometer markings without ever producing a full circle of markings that could be used over and over in the particular tachometer device.

The closest prior art known to applicants has thus stagnated at a level which does not permit the manufacture of reusable rotary tachometer devices with tachometer markings occupying a continuous circular array. Rather, the prior art has relegated a basically promising principle to a narrow sector limited to each duration of actual use of the equipment.

SUMMARY OF THE INVENTION

It is a broad subject of this invention to overcome the above mentioned disadvantages.

It is a related object of this invention to provide improved methods and apparatus for manufacturing a tachometer of a type having tachometer markings arranged in a continuous circular array on a rotary tachometer device.

It is a further object of this invention to provide improved tachometers made by the methods of the subject invention.

It is a related object of this invention to provide improved rotary tachometer devices in which tachometer markings are arranged in a continuous circular array.

It is also an object of this invention to provide methods and apparatus for manufacturing an improved drive assembly including a capstan and a tachometer having a rotary tachometer device with tachometer markings spatially distributed in accordance with an eccentricity of the capstan.

It is a related object of this invention to provide improved rotary tachometer devices having tachometer markings spatially distributed in accordance with an eccentricity of the rotary tachometer device.

It is a further object of the invention to provide a drive assembly including a capstan and a tachometer having a rotary tachometer device with tachometer markings arranged in accordance with an eccentricity of the capstan.

Other objects of this invention will become apparent in the further course of the subject disclosure.

From a first aspect thereof, the invention resides in a method of manufacturing a tachometer of a type having annularly arranged tachometer markings on a rotary tachometer device. The invention according to this aspect resides, more specifically, in the improvement comprising in combination the steps of rotating the tachometer device, generating a signal having recurring signal portions for providing the markings upon recordation on the rotary tachometer device, adapting the number of the signal portions occurring in the signal during a revolution of the rotating tachometer device to a whole number of tachometer markings accommodable on the tachometer device in a continuous circular array, and providing on the tachometer device tachometer markings in a continuous circular array by recording the signal having the adapted number of signal portions onto the rotating tachometer in a continuous circular array.

From another aspect thereof, the invention resides in a tachometer made by the latter method.

From another aspect thereof, the invention resides in a method of manufacturing a drive assembly including a capstan having a cylindrical drive surface and a tachometer having a rotary tachometer device coupled to the capstan and bearing annularly arranged tachometer markings. The invention according to this aspect resides, more specifically, in the improvement comprising in combination the steps of applying rotary power from outside the capstan to the cylindrical drive surface and rotating the tachometer device with the applied rotary power by way of the cylindrical drive surface, generating a signal having recurring signal portions for providing the markings upon recordation on the rotary tachometer device, adapting the number of the signal portions occurring in the signal during a revolution of the rotating tachometer device to a whole number of tachometer markings accommodable on the tachometer device in a continuous circular array, and providing on the tachometer device tachometer markings spatially distributed in accordance with an eccentricity of the capstan by recording the signal having the adapted number of signal portions onto the rotary tachometer device in a continuous circular array while the tachometer device is being rotated with the applied rotary power by way of the cylindrical drive surface.

From a further aspect thereof, the invention resides in a tachometer made by the latter method.

From another aspect thereof, the invention resides in apparatus for manufacturing a tachometer of a type having annularly arranged tachometer markings on a rotary tachometer device. The invention according to this aspect resides, more specifically, in the improvement comprising, in combination, means for rotating the tachometer device, means for generating a signal having recurring signal portions for providing the markings upon recordation on the rotary tachometer device, means connected to the generating means for adapting the number of the signal portions occurring in the signal during a revolution of the rotating tachometer device to a whole number of tachometer markings accommodable on the tachometer device in a continuous circular array, and means operatively associated with the tachometer device for providing on the tachometer device tachometer markings by recording the signal having the adapted number of signal portions onto the rotating tachometer device in a continuous circular array.

From a further aspect thereof, the invention resides in apparatus for manufacturing a drive assembly including a capstan having a cylindrical drive surface and a tachometer having a rotary tachometer device coupled to the capstan and bearing annularly arranged tachometer markings. The invention according to this aspect resides, more specifically, in the improvement comprising, in combination, means for applying rotary power from outside the capstan to the cylindrical drive surface and for rotating the tachometer device with the applied rotary power by way of the cylindrical drive surface, means for generating a signal having recurring signal portions for providing the markings upon recordation on the rotary tachometer device, means connected to the generating means for adapting the number of the signal portions occurring in the signal during a revolution of the rotating tachometer device to a whole number of tachometer markings accommodable on the tachometer device in a continuous circular array, means operatively associated with the tachometer device for providing on the tachometer device tachometer markings spatially distributed in accordance with an eccentricity of the capstan by recording the signal having the adapted number of signal portions onto the rotary tachometer device in a continuous circular array while the tachometer device is being rotated with the applied rotary power by way of the cylindrical drive surface.

The invention resides also in a rotary tachometer device comprising mutually spaced tachometer markings arranged in a continuous circular array, with different pairs of adjacent tachometer markings subtending different angles between radii of said circular array in accordance with an eccentricity of the rotary tachometer device.

From a further aspect thereof, the invention resides in a drive assembly comprising a motor, a capstan coupled to the motor, and a tachometer including a rotary tachometer device coupled to the motor and comprising mutually spaced tachometer markings arranged in a continuous circular array, with different pairs of adjacent tachometer markings subtending different angles between radii of said circular array in accordance with an eccentricity of the capstan.

BRIEF DESCRIPTION OF THE DRAWINGS

The subject invention and its objects will become more readily apparent from the following detailed description of preferred embodiments thereof, illustrated by way of example with the aid of and in the accompanying drawings in which like reference numerals designate like or functionally equivalent parts and in which:

FIG. 1 is a side view of parts of a magnetic tape transport having a rotary tachometer device;

FIG. 2 is a side view similar to FIG. 1 showing a method and apparatus for manufacturing a tachometer in accordance with a preferred embodiment of the subject invention; and FIG. 3 is a top view of a rotary tachometer device manufactured in accordance with a preferred embodiment of the subject invention and a block diagram of related equipment for manufacturing the rotary tachometer device also in accordance with a preferred embodiment of the invention.

DESCRIPTION OF PREFERRED EMBODIMENTS

The part of the magnetic tape transport 10 shown in FIG. 1 is of a familiar type wherein a tape drive capstan 12 is coupled to an electric drive motor 13 by a shaft 14 which also rotates a disk 15 or other rotary device of a tachometer 16. The details and arrangements of the equipment may vary among different models, but the underlying principle typically is that the motor 13 rotates both the capstan 12 and the tachometer device 15 so as to advance a magnetic recording tape or other elongate information carrier shown in dotted outline at 18 past a magnetic recording and/or reproduce head or other information transducer shown in dotted outline at 19. Other parts of the tape transport 10 are secondary to the disclosed invention and, since well known as such, are not shown in the drawings, but typically include tape supply and takeup reels or members, reel drives and tape tension control devices.

The tachometer disk 15 bears annularly arranged tachometer markings which are not shown in FIG. 1, but which are familiar to those skilled in the art under consideration. During rotation of the disk 15, a relatively stationary pickup device 21 senses the tachometer markings on the disk and provides a corresponding tachometer signal which is applied via a lead to a capstan servo control 23 which, in turn, controls the motor 13 via a lead 24.

The parts so far discussed with respect to FIG. 1 may all be of a conventional type. In particular, the pickup device may be a magnetic reproduce head if the tachometer markings are recorded magnetically on the disk 15. On the other hand, an optical pickup device may be employed if the tachometer markings are of the familiar line pair type in which radially disposed black lines alternate with transparent portions.

A hub 25 attaches the disk 15 to the shaft 14, while that shaft or the capstan 12 is rotatably mounted by a bearing 26 relative to a base plate 27. While the bearing 26 has been shown associated with the base plate 27, it is, in practice, more typically associated or integral with the motor 13.

During the operation of the tape transport partially illustrated in FIG. 1, an eccentricity in the capstan 12 or tachometer device 15 will provide a run out or periodic perturbation in the tach signal proceeding from the pickup 21 to the capstan servo 23. This, in turn, leads to velocity fluctuations or flutter and eventuates other detriments discussed above or else known to those skilled in the art.

Against this background, it is an object of the preferred embodiment of the subject invention shown in FIGS. 2 and 3 to take the drive assembly 29 comprising the capstan 12, motor 13 and tachometer device 15, and, broadly speaking, also the rotary mounting including the bearing 26 on the base plate 27, and to manufacture for that drive assembly its own specific tachometer facility comprising tachometer markings arranged in a continuous circular array and being usable during a multitude of operations in the subsequent use of the tape transport 10.

Accordingly, the tachometer manufacturing equipment shown in FIG. 2 includes a precision speed source comprising a relatively stationary motor 32 and a precision roller 33 driven and rotated by the motor 32 upon closure of a switch 34 which connects the motor 32 to a source of electric power 35. The precision roller 33 is applied to the cylindrical drive surface 36 of the capstan 12 in order to apply rotary power from outside the capstan 12 to the cylindrical drive surface 36 and to rotate the tachometer device 15 with that applied rotary power by way of the cylindrical drive surface 36.

A signal generator 38 generates a signal having recurring signal portions for providing the desired tachometer markings upon recordation on a rotary tachometer device or disk 115. To this end, a lead 39 applies the generated signal to a recording device 41. In principle, the device 41 could operate on the basis of any one of various principles, and could thus be an optical recording device. More typically, however, and in accordance with a preferred embodiment of the subject invention, the recording device 41 is a magnetic recording head or device for magnetically recording tachometer markings in a circular magnetic recording track 42 (see FIG. 3) provided on the tachometer disk 115, while that disk is being rotated with the applied rotary power by way of the cylindrical drive surface 36 of the capstan 12 to provide magnetic tachometer markings.

In order to provide the manufactured tachometer device 115 with the desired kind and extent of utility, the signal generator 38 will adapt the number of the signal portions occurring in the signal during a revolution of the rotating tachometer device 115 to a whole number of tachometer markings accommodable on the tachometer device 115 in a continuous circular array.

To this end, and by way of example, the signal generator 38 may include, and may have associated therewith, the equipment shown more specifically in FIG. 3.

In addition to the recording head 41, the equipment shown in FIG. 3 has a reproduce head 43 which cooperates with the recording device 41. While it is the function of the recording device 41 to provide the desired tachometer markings on the disk 115 during the rotation thereof, it is the function of the device 43 to reproduce such provided markings from the rotary tachometer disk in the form of a playback signal wherein the reproduced markings are represented by corresponding signal portions while the tachometer device 115 is being rotated with the applied rotary power by way of the cylindrical drive surface 36 of the capstan 12. The signal generator 38 then derives from the playback signal occurring in a lead 45 a signal having the above mentioned adapted number of signal portions.

One way of deriving that desired signal in accordance with the preferred embodiment illustrated in FIG. 3, is to provide the tachometer disk 115 with a reference or strobe marking 46 which passes an auxiliary pickup device 47 once during each revolution of the disk 115 and which thus provides in a lead 48 a strobe having a signal portion or pulse indicative of a revolution of the rotating tachometer device 115.

The strobe signal is amplified at 49 and is applied via a lead 51 to a first input of a phase detector 52. The playback signal generated by the reproduce head 43 in the lead 45 is counted down by a divider or count-down device 54 in order to be phase comparable with the strobe signal. In particular, the playback signal may be counted down by a divisor equal to the whole number of tachometer markings accommodable in a continuous circular array in the track 53 on the disk 115. The counted-down signal proceeds via a lead 56, is amplified at 57 and is applied to the second input of the phase detector 52 via a lead 58.

A phase comparison of the strobe signal and counted-down playback signal provides an error signal in an output lead of the phase detector 52. In principle, it would be possible to insert a frequency multiplier, as shown in dotted outline at 61 into the lead 48. By way of example, that component 61 would multiply the strobe signal by a factor equal to the whole number of tachometer markings accommodable on the tachometer disk 115 in a continuous circular array. The multiple strobe signal thus provided in the lead 51 would then be phase comparable with the playback signal provided by the reproduced device 43, and the count-down device 54 would become unnecessary. The result would again be an error signal at the phase detector output lead 59 indicative of the phase difference between the strobe and playback signals.

This would render the count-down device 54 and the multiplier 61 unnecessary.

The error signal provided by the phase detector 54 proceeds via the output lead 59 and a low-pass loop filter 63 to the input of a voltage controlled oscillator 64 which, in turn, provides in a lead 65 a signal having the rate of recurrence of signal portions thereof controlled with the error signal 51. The signal thus generated by the voltage controlled oscillator 64 is amplified at 66 and, upon closure of a switch 67, is applied to the recording device 41.

Because of the closed loop nature of the signal generator and ancillary equipment shown in FIG. 3, the error signal produced by the phase detector 52 will change the output frequency of the voltage controlled oscillator until the phase-compared strobe and playback signals coincide. When this condition exists, the number of tachometer lines or markings per revolution is exactly equal to the divisor of the count-down device 54 or the factor of the multiplier 61 or, in general, to the whole number of tachometer markings accommodable on the tachometer device in a continuous circular array without any breaks, overlapping portions or other discontinuities which would indicate a beginning or end of the tachometer marking array or which would otherwise interfere with the performance of the tachometer upon its utilization in the tape transport or other useful equipment.

In practice, this ideal condition cannot necessarily be expected to come about instantaneously. Accordingly, the equipment shown in FIG. 3 includes an erase head 71 which is energized by an erasing current generator 72 upon closure of a switch 73. That switch is maintained closed and the recorded tachometer markings are, accordingly, continously erased until the rotated system has settled down to a condition in which the recorded tachometer markings recur in a continuous circular array without breaks or overlapping portions. The switch 73 may then be opened prior to the opening of the switch 67 so that a continuous circular array of tachometer markings is recorded in the track 76. The switch 67 may then also be opened and the tachometer disk 115 is thereupon ready for use in the tape transport 10 or, depending on the nature of the pickup 21, for further processing.

As a special feature of the manner of rotating the drive assembly in accordance with a preferred embodiment shown in FIG. 2, the recorded tachometer markings 75 will be spatially distributed in the circular array or track 76 in accordance with the eccentricity of the capstan 12 or of its circular drive surface 36 to be more exact. This has been shown in a somewhat exaggerated manner at the arrow head of the lead line of the reference numerals 76 where the spacing between adjacent tachometer markings is wider than, for instance, at 77 in FIG. 3. Stated generally, the markings 75 are mutually spaced in the circular array or track 76 by different amounts of spacing in accordance with an eccentricity of the capstan 12 or rotary tachometer device 15.

In that sense, the mutual spacings between the tachometer markings 75 vary as a function of the eccentricity of the capstan or rotary tachometer device.

In the past, the spacing between markings of plotting protractors has sometimes varied as a function of the distances of the markings from the center of the protractor, as may be seen in U.S. Pat. No. 2,178,962, by A. O. Gottschalk, issued Nov. 7, 1939. Of course, the angle between radii of the protractor subtended by any two adjacent markings was not in these protractors varying as a function of the distance or distances of these markings from the center of the protractor. For example, the angle subtended by, say, the 10° marking and the 20° marking is 10°, irrespective of the distance of these markings from the center of the protractor. Also, Gottschalk's teaching cannot result in an arrangement of the markings in a continuous circular array, as distinguished from a spiral curve with a sharp discontinuity.

In contrast to all the prior art, the drive assembly according to the illustrated referred embodiment of the subject invention, in addition to the motor 13 and the capstan 12 coupled to that motor, includes a tachometer 16 having a rotary tachometer device 115 coupled to the motor 13 and comprising mutually spaced tachometer markings 75 arranged in a continuous circular array 76, with different pairs of adjacent tachometer markings, such as the pair 75° and the pair 75" shown in FIG. 3, subtending different angles $\alpha$ and $\beta$, respectively, between radii of the circular array 76 in accordance with an eccentricity of the capstan 12.

This is believed to represent the best mode of carrying the subject invention into effect. However, it should be understood that the broad concept of the invention is not necessarily so limited. For instance, it would be possible to delete the precision speed source 31 and to rotate the drive assembly 29 with its own motor 13, for instance. In that case, the basic principles of the subject invention would still be effective to provide on the tachometer device 115 a continuous circular array of tachometer markings 75. An eccentricity of the rotating device 115 would then be reflected in a course of the recorded circular array of tachometer markings which is eccentric to the periphery of the circular disk 115.

In particular, the rotary tachometer device then comprises mutually spaced tachometer markings arranged in a continuous circular array 76, with different pairs of adjacent tachometer markings 75' and 75" subtending different angles $\alpha$ and $\beta$, respectively, between radii of that circular array 76 in accordance with an eccentricity of the rotary tachometer device 115.

The latter version is also within the scope of the subject invention, and is still of utility, though it is not an equivalent of the version wherein the drive assembly is rotated by externally applied rotary power as, for instance, shown in FIG. 2.

So far, components of various signals occurring in the system of the subject invention and its preferred embodiments have been broadly referred to as "signal portions". In practice, these signal portions may be represented by pulses, by amplitudes of a sine wave or by other predetermined signal intensities. For instance, the tachometer markings 75 may be produced by applying to the recording device via the lead 39 a signal having pulses corresponding to the markings. However, a sine wave may serve the same purpose, as it is well known in the magnetic recording art that a sine wave may be recorded as a line pattern because of a non-linear response of the recording medium.

Reverting to FIG. 1, the recorded tachometer disk 115 may be employed in lieu of the prior-art disk 15 in the tape transport 10 to servocontrol the advance of the magnetic tape 18 past the recording or playback device 19. If the pickup 21 comprises a magnetic reproduce head, the magnetically recorded tachometer markings may be employed in the tape transport without further processing. On the other hand, some magneto-optical technique may be employed to render the recorded tachometer markings discernible by an optical pickup technique.

By way of example, and in accordance with a further preferred embodiment of the subject invention, a magnegraphic technique may be employed to convert the magnetically recorded tachometer markings into a line pair discernible by an optical pickup. In this connection, the following U.S. patents are herewith incorporated by reference herein: U.S. Pat. No. 2,793,135, by J. C. Sims et al, issued May 21, 1957; U.S. Pat. No. 3,250,636, by R. A. Wilferth, issued May 10, 1966, U.S. Pat. No. 3,512,170, by A. M. Nelson, issued May 12, 1970; U.S. Pat. No. 3,555,556, by G. R. Nacci, issued Jan. 12, 1971; U.S. Pat. No. 3,582,877, by L. P. Benoit, issued June 1, 1971; U.S. Pat. No. 3,717,459, by R. J. McClure, issued Feb. 20, 1973, and 3,717,460, by F. J. Jeffers et al, issued Feb. 20, 1973. In brief, these patents disclose methods, apparatus and media for rendering magnetic records visible.

By way of example, magnetic developer of the type disclosed in the cited references may, in accordance with the block 81 shown in FIG. 3, be applied to the magnetically recorded markings 75 in order to render these markings visible.

The applied magnetic developer may then be fused on the tachometer disk 115 as shown by the block 82. The tachometer disk 115 is thus rendered capable of use with an optical pickup 21 in the tape transport 10 shown in FIG. 1.

The subject extensive disclosure will render apparent or suggest various modifications and variations within the spirit and scope of the disclosed invention to those skilled in the art.

We claim:

1. In a method of manufacturing a tachometer of a type having annularly arranged tachometer markings on a rotary tachometer device, the improvement comprising in combination the steps of:

rotating said tachometer device;

generating a signal having recurring signal portions of providing said markings upon recordation on said rotary tachometer device;

adapting the number of said signal portions occurring in said signal during a revolution of said rotating tachometer device to a whole number of tachometer markings accommodable on said tachometer device in a continuous circular array; and providing on said tachometer device tachometer markings in a continuous circular array by recording said signal having said adapted number of signal portions onto said rotating tachometer device in a continuous circular array.

2. A method as claimed in claim 1, including the steps of:

reproducing said provided markings from said rotating tachometer device in the form of a playback signal wherein said reproduced markings are represented by corresponding signal portions; and deriving from said playback signal said signal having said adapted number of signal portions.

3. A method as claimed in claim 1, including the steps of:

providing a strobe signal having a signal portion indicative of a revolution of said rotating tachometer device;

reproducing said provided markings from said rotating tachometer device in the form of a playback signal wherein said reproduced markings are represented by corresponding signal portions;

deriving an error signal from a phase comparison of said strobe and playback signals;

controlling the rate of recurrence of signal portions in said generated signal with said error signal; and recording said signal portions having said controlled rate of recurrence on said rotating tachometer device in a continuous circular array.

4. A method as claimed in claim 1, wherein:

said rotary tachometer device is provided with a circular magnetic recording track; and said signal having said adapted number of signal portions is magnetically recorded in said recording track to provide magnetic tachometer markings.

5. A method as claimed in claim 4, wherein:

said magnetic tachometer markings are developed into optically discernible tachometer markings.

6. In a method of manufacturing a drive assembly including a capstan having a cylindrical drive surface and a tachometer having a rotary tachometer device coupled to said capstan and bearing annularly arranged tachometer markings, the improvement comprising in combination the steps of:

applying rotary power from outside said capstan to said cylindrical drive surface and rotating said tachometer device with said applied rotary power by way of said cylindrical drive surface;

generating a signal having recurring signal portions for providing said markings upon recordation on said rotary tachometer device;

adapting the number of said signal portions occurring in said signal during a revolution of said rotating tachometer device to a whole number of tachometer markings accommodable on said tachometer device in a continuous circular array; and providing on said tachometer device tachometer markings spatially distributed in accordance with an eccentricity of said capstan by recording said signal having said adapted number of signal portions onto said rotary tachometer device in a continuous circular array while said tachometer device is being rotated with said applied rotary power by way of said cylindrical drive surface.

7. A method as claimed in claim 6, including the steps of:

reproducing said provided markings from said rotary tachometer device in the form of a playback signal wherein said reproduced markings are represented by corresponding signal portions while said tachometer device is being rotated with said applied rotary power by way of said cylindrical drive surface; and deriving from said playback signal said signal having said adapted number of signal portions.

8. A method as claimed in claim 6, including the steps of:

providing a strobe signal having a signal portion indicative of a revolution of said rotating tachometer device;

reproducing said provided markings from said rotary tachometer device in the form of a playback signal wherein said reproduced markings are represented by corresponding signal portions while said tachometer device is being rotated with said applied rotary power by way of said cylindrical drive surface;

deriving an error signal from a phase comparison of said strobe and playback signals;

controlling the rate of recurrence of signal portions in said generated signal with said error signal; and recording said signal portions having said controlled rate of recurrence on said rotary tachometer device in a continuous circular array while said tachometer device is being rotated with said applied rotary power by way of said cylindrical drive surface.

9. A method as claimed in claim 6, wherein:
said rotary tachometer device is provided with a circular magnetic recording track; and
said signal having said adapted number of signal portions is magnetically recorded in said recording track while said tachometer device is being rotated with said applied rotary power by way of said cylindrical drive surface to provide magnetic tachometer markings.

10. A method as claimed in claim 9, wherein: p1 said magnetic tachometer markings are developed into optically discernible tachometer markings.

11. In apparatus for manufacturing a tachometer of a type having annularly arranged tachometer markings on a rotary tachometer device, the improvement comprising in combination:
means for rotating said tachometer device;
means for generating a signal having recurring signal portions for providing said markings upon recordation on said rotary tachometer device;
means connected to said generating means for adapting the number of said signal portions occurring in said signal during a revolution of said rotating tachometer device to a whole number of tachometer markings accommodable on said tachometer device in a continuous circular array; and
means operatively associated with said tachometer device for providing on said tachometer device tachometer markings by recording said signal having said adapted number of signal portions onto said rotating tachometer device in a continuous circular array.

12. An apparatus as claimed in claim 11, wherein:
said generating means include means for reproducing said provided markings from said rotating tachometer device in the form of a playback signal wherein said reproduced markings are represented by corresponding signal portions; and
said adapting means include means for deriving from said playback signal said signal having said adapted number of signal portions.

13. An apparatus as claimed in claim 11, wherein:
said generating means include means for reproducing said provided markings from said rotating tachometer device in the form of a playback signal wherein said reproduced markings are represented by corresponding signal portions;
said adapting means include means operatively associated with said tachometer device for providing a strobe signal having a signal portion indicative of a revolution of said rotating tachometer device, means connected to said reproducing means and to said strobe signal providing means for deriving an error signal from a phase comparison of said strobe and playback signals, and means connected to said error signal deriving means for controlling the rate of recurrence of signal portions in said generated signal with said error signal; and
said means for providing said tachometer markings include means for recording said signal portions having said controlled rate of recurrence on said rotating tachometer device.

14. An apparatus as claimed in claim 11, wherein:
said rotary tachometer device includes a circular magnetic recording track; and
said means for providing said tachometer markings include means for magnetically recording said signal having said adapted number of signal portions in said recording track to provide magnetic tachometer markings.

15. An apparatus as claimed in claim 14, including:
means operatively associated with said tachometer device for developing said magnetic tachometer markings into optically discernible tachometer markings.

16. In apparatus for manufacturing a drive assembly including a capstan having a cylindrical drive surface and a tachometer having a rotary tachometer device coupled to said capstan and bearing annularly arranged tachometer markings, the improvement comprising in combination:
means for applying rotary power from outside said capstan to said cylindrical drive surface and for rotating said tachometer device with said applied rotary power by way of said cylindrical drive surface;
means for generating a signal having recurring signal portions for providing said markings upon recordation on said rotary tachometer device;
means connected to said generating means for adapting the number of said signal portions occurring in said signal during a revolution of said rotating tachometer device to a whole number of tachometer markings accommodable on said tachometer device in a continuous circular array;
means operatively associated with said tachometer device for providing on said tachometer device tachometer markings spatially distributed in accordance with an eccentricity of said capstan by recording said signal having said adapted number of signal portions onto said rotary tachometer device in a continuous circular array while said tachometer device is being rotated with said applied rotary power by way of said cylindrical drive surface.

17. An apparatus as claimed in claim 16, wherein:
said generating means include means for reproducing said provided markings from said rotary tachometer device in the form of a playback signal wherein said reproduced markings are represented by corresponding signal portions while said tachometer device is being rotated with said applied rotary power by way of said cylindrical drive surface; and
said adapting means include means for deriving from said playback signal said signal having said adapted number of signal portions.

18. An apparatus as claimed in claim 16, wherein:
said generating means include means for reproducing said provided markings from said rotary tachometer device in the form of a playback signal wherein said reproduced markings are represented by corresponding signal portions while said tachometer device is being rotated with said applied rotary power by way of said cylindrical drive surface; and
said adapting means include means operatively associated with said tachometer device for providing a strobe signal having a signal portion indicative of a revolution of said rotating tachometer device, means connected to said reproducing means and to said strobe signal providing means for deriving an error signal from a phase comparison of said stobe and playback signals, and means connected to said error signal driving means for controlling the rate of recurrence of signal portions in said generated signal with said error signal; and said means for providing said spatially distributed tachometer markings include means for recording said signal portions having said controlled rate of recurrence on said rotary tachometer device in a continuous circular array while said tachometer device is being rotated with said applied rotary power by way of said cylindrical drive surface.

19. An apparatus as claimed in claim 16, wherein:
said rotary tachometer device includes a circular magnetic recording track; and
said means for providing said spatially distributed tachometer markings include means for magnetically recording said signal having said adapted number of signal portions in said recording track to provide magnetic tachometer markings.

20. An apparatus as claimed in claim 19, including:
means operatively associated with said tachometer device for developing said magnetic tachometer markings into optically discernible tachometer markings.

21. A rotary tachometer device comprising mutually spaced tachometer markings arranged in a continuous circular array, with different pairs of adjacent tachometer markings subtending different angles between radii of said circular array in accordance with an eccentricity of said rotary tachometer device.

22. A drive assembly comprising:
a motor;
a capstan coupled to said motor; and
a tachometer including a rotary tachometer device coupled to said motor and comprising mutually spaced tachometer markings arranged in a continuous circular array, with different pairs of adjacent tachometer markings subtending different angles between radii of said circular array in accordance with an eccentricity of said capstan.

* * * * *